(12) United States Patent
Sevenhuijsen

(10) Patent No.: US 7,470,410 B2
(45) Date of Patent: Dec. 30, 2008

(54) SUPPORT SYSTEM FOR REACTOR VESSEL INTERNALS

(75) Inventor: Eric Sevenhuijsen, Houston, TX (US)

(73) Assignee: Shell Oil Company, Houston, TX (US)

( * ) Notice: Subject to any disclaimer, the term of this patent is extended or adjusted under 35 U.S.C. 154(b) by 328 days.

(21) Appl. No.: 11/359,321

(22) Filed: Feb. 22, 2006

(65) Prior Publication Data

US 2007/0025495 A1 Feb. 1, 2007

Related U.S. Application Data

(60) Provisional application No. 60/656,526, filed on Feb. 25, 2005.

(51) Int. Cl.
*B01J 8/02* (2006.01)
*B01J 35/02* (2006.01)

(52) U.S. Cl. .................................. 422/220; 376/203

(58) Field of Classification Search ............... 422/220; 376/203
See application file for complete search history.

(56) References Cited

U.S. PATENT DOCUMENTS

| | | | |
|---|---|---|---|
| 2,292,716 A | 8/1942 | Pyzel | 210/134 |
| 2,767,066 A | 10/1956 | Zimmerman, Jr. | 23/288 |
| 3,363,843 A | 1/1968 | Ballard et al. | 239/504 |
| 3,479,748 A | 11/1969 | Sietmann | 34/33 |
| 3,824,080 A | 7/1974 | Smith et al. | 23/288 R |
| 3,824,081 A | 7/1974 | Smith et al. | 23/288 R |
| 4,836,989 A | 6/1989 | Aly et al. | 422/195 |
| 4,904,456 A * | 2/1990 | Anderson | 422/220 |
| 4,975,036 A | 12/1990 | Jagannathan | 422/216 |
| 5,484,578 A | 1/1996 | Muldowney et al. | 422/220 |
| 6,669,915 B1 | 12/2003 | Boyd et al. | 422/224 |

FOREIGN PATENT DOCUMENTS

DE 2359954 A * 6/1975

OTHER PUBLICATIONS

International Search Report for PCT/US2006/006273 of Jul. 13, 2006.
Written Opinion for PCT/US2006/006273 of Jul. 13, 2006.

* cited by examiner

*Primary Examiner*—Walter D Griffin
*Assistant Examiner*—Natasha Young
(74) *Attorney, Agent, or Firm*—Charles W. Stewart

(57) ABSTRACT

The invention is a support system for use with a reactor vessel that defines a reactor zone and has an inlet manway providing an opening into the reactor zone. The support system comprises a manway insert that is supported by the inlet manway and extends through the opening of the inlet manway and into the reactor zone. Attached to the manway insert is attachment means for connecting a support hanger to the manway insert and for transferring the load from the support hanger to the manway insert. The support hanger has an upper end and a lower end with the upper end being fixedly attached to the attachment means and the lower end being fixedly attached to support structure means for supporting a load.

11 Claims, 4 Drawing Sheets ic reactor vessel and
support system of the invention.

SUPPORT SYSTEM FOR REACTOR VESSEL INTERNALS

This application claims the benefit of U.S. Provisional Application No. 60/656,526 filed Feb. 25, 2005, the entire disclosure of which is hereby incorporated by reference.

The invention relates to a system for supporting certain reactor internals within a reactor vessel.

Downflow reactor vessels are commonly used in the chemical and refining industries in catalytic processes such as hydrotreating, hydrocracking, hydrodesulfurization, hydrofinishing, and hydrodewaxing. The typical downflow reactor is a vessel that is equipped with a feed inlet and a reactor effluent outlet. Contained within the vessel is a bed of catalyst particles with which the feed that is introduced into the vessel is contacted.

It is often advantageous to incorporate within a downflow reactor vessel a feed distribution tray disposed between the point of feed introduction into the reactor vessel and the bed of catalyst particles for the purpose of distributing the feed fluid across the cross section of the catalyst bed. A typical manner by which the feed distribution tray is incorporated into the reactor vessel is by affixing or connecting the feed distribution tray or its supporting structure to the inside wall of the reactor vessel. This connection is often achieved by welding attachments to the inside wall of the reactor vessel. Affixing these reactor internals to the inside of a reactor wall, however, can be an unsuitable way of supporting the feed distribution system within the reactor vessel. For instance, welding to the inside wall of a hydroprocessing reactor vessel with a weld overlay material that is susceptible to hydrogen can result in cracking of the weld overlay metal and to other problems.

The problems associated with affixing reactor internals to the inside wall of a reactor vessel may be resolved by a novel support system for supporting reactor internals inside a reactor vessel without the need to affix the support system to the reactor inside wall.

Thus, an object of the invention is to provide a support system for supporting reactor internals within a reactor vessel without the need to affix the support system to the inside wall of the reactor.

Accordingly, provided is a support system for use with a reactor vessel having an inside wall that defines a reaction zone capable of containing a bed of catalyst particles and which includes an inlet manway providing an opening into the reaction zone. The support system includes a manway insert having an insert upper end and an insert lower end, wherein the manway insert is capable of extending through the opening into the reaction zone. It further includes a support hanger having a hanger upper end and a hanger lower end with the hanger upper end being fixedly connected to the insert lower end, and a support structure capable of supporting a fluid distributor tray and which is fixedly connected to the hanger lower end.

The invention relates to apparatus for the support of certain internals of a downflow-type reactor without the need to affix the support apparatus to the inside wall of the reactor.

Figure 1:
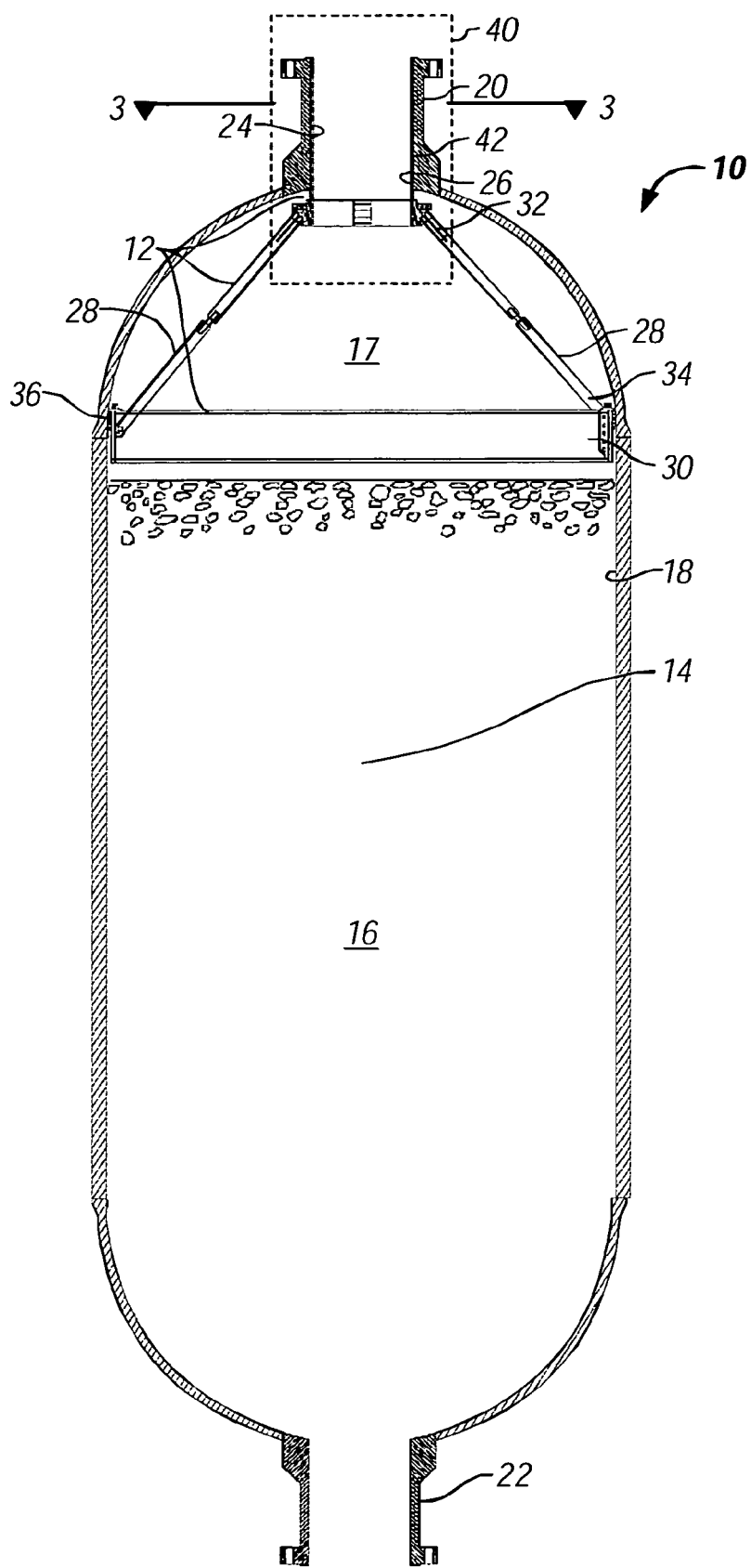
FIG. 1 is a vertical cross section of a reactor vessel and support system of the invention.

In FIG. 1 is presented a vertical cross section of a reactor vessel 10 that is equipped with the support system 12. The reactor vessel 10 may be any suitable type of vessel that defines a reaction zone 14 capable of containing a bed 16 of catalyst particles with which a feedstock is contacted. The reaction zone 14 includes both an inlet/fluid distribution zone 17 and the bed 16 that defines a zone in which, typically, the process reactions occur. Reactor vessel 10 has an inside wall 18 which defines the reaction zone 14 that contains the bed 16 of catalyst particles.

The reactor vessel 10 is equipped with an inlet manway 20 and an outlet manway or, alternatively, a reactor effluent outlet 22. The inlet manway 20 has a manway inside wall 24 that defines an opening or conduit allowing for the entry or passage from outside to within the reaction zone 14. Thus, inlet manway 24 provides means for communication between the outside and inside of the reactor vessel 10. The reactor effluent outlet 22 provides means for removing a reactor effluent from the reaction zone 14 within the reactor vessel 10.

The support system 12 includes a manway insert 26, support hangers 28 and support structure 30. The support hangers 28 include a hanger upper end 32 and a hanger lower end 34. The support hangers 28 provide means by which the load from the support structure 30 and the objects that are supported upon such support structure 30 is transmitted to the manway insert 26. Thus, the support hangers 28 will be, in most instances, in tension. The hanger lower end 34 is fixedly connected to the support structure 30 by any suitable connection means for connecting the hanger lower end 34 to the support structure 30 and can include welding or connecting using bolts or any other known means for connecting metal parts.

In order to permit the off-site fabrication and the separate assembly of the support system 12 within the reactor vessel 10, it is preferred for the connection means to be a plate 36 that is affixed, preferably by welding, to the support structure 30 and which plate 36 includes a hole through which a bolt may be inserted. The hanger lower end 34 further includes a hole that is matched with the hole of plate 36 through which a bolt may pass to thereby provide for the connecting means for fixedly connecting the hanger lower end 34 to the support structure 30. It is, however, recognized that any other suitable means for fixedly connecting the hanger lower end 34 to the support structure 30 may be used.

Figure 2:
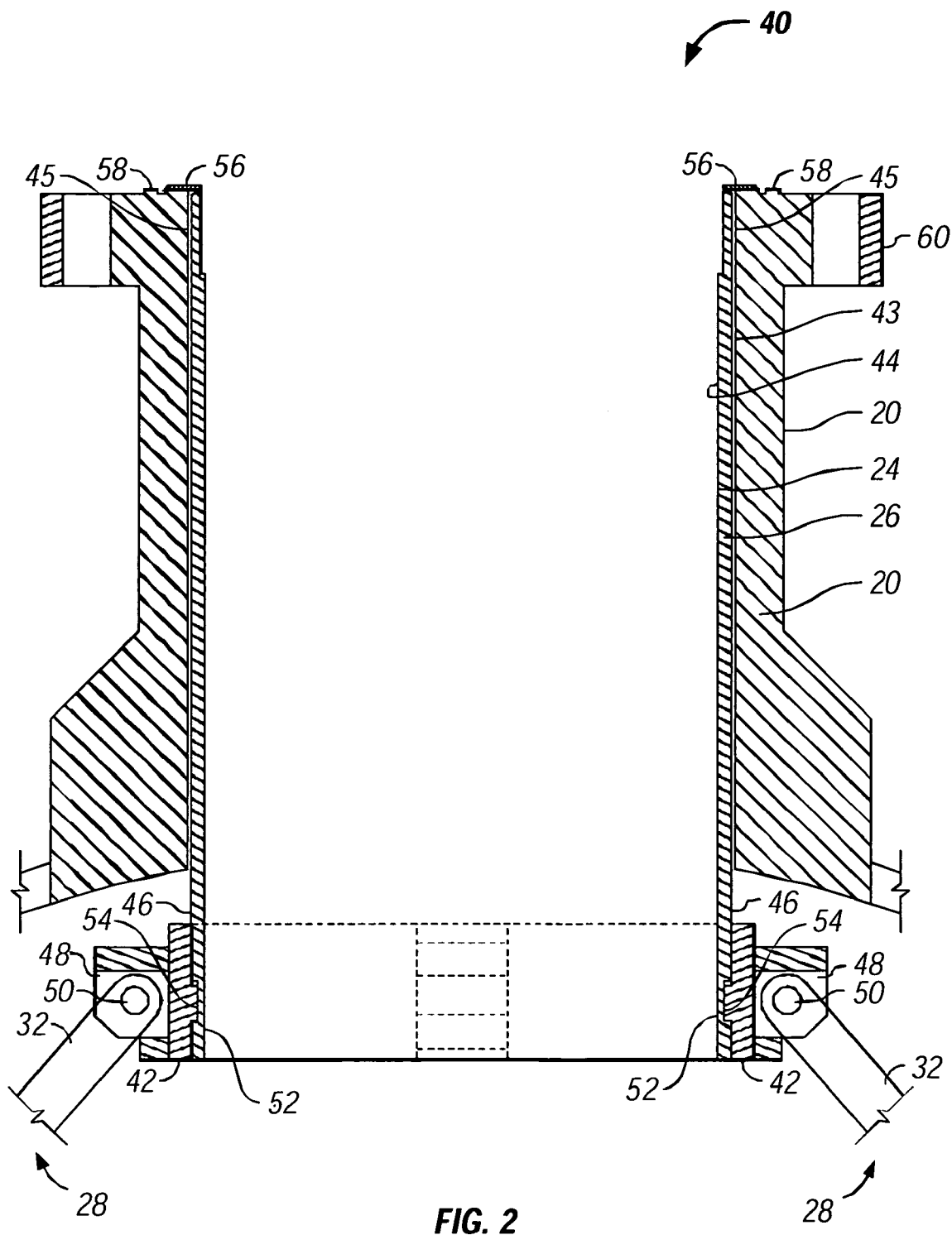
FIG. 2 is a detail sectional view showing the upper portion of the support system and the inlet manway of the reactor vessel shown in FIG. 1.

Reference now is made to FIG. 2, which presents an enlarged view of the sectional detail 40 as indicated in FIG. 1. The enlarged sectional detail 40 shows the inlet manway 20 and portions of the support system 12 (entire support system 12 is shown in FIG. 1) that include the manway insert 26, the hanger upper end 32 of the support hangers 28, and clamp 42. The hanger upper end 32 is fixedly connected to the manway insert 26 by clamp 42.

The manway insert 26 has an insert outside wall 43, an insert inside wall 44, an insert upper end 45 and an insert lower end 46. While what is depicted is clamp 42 used to fasten the hanger upper end 32 to the manway insert 26, it is understood that any suitable connection means for fastening the hanger upper end 32 to the manway insert 26 may be used. Such connecting means can include welding or connecting using bolts or any other suitable means for connecting metal parts.

Affixed to the clamp 42 is a plate 48 having a hole through which a bolt may be inserted. The hanger upper end 32 further may include a hole 50 that may be matched with the hole of plate 48 through which a bolt may pass to thereby provide for connecting means for fixedly connecting the hanger upper end 32 to the clamp 42. The clamp 42 may be detachable or removable so as to permit its fabrication off-site with it being separately assembled and installed within the reactor vessel 10.

It is preferred for the clamp 42, or any other connecting means for affixing the hanger upper end 32 to the manway insert 26, to be positioned at the insert lower end 46. When the clamp 42 is used as connecting means for affixing the support hanger 28 to the manway insert 26, it is desirable for a groove 52 to be machined into the outer surface of the insert lower end 46 and for the clamp 42 to have a matching or corresponding protrusion 54, which may be fitted together to form a joint for joining the clamp 42 to the insert lower end 46.

As mentioned above, the inlet manway 20 has a manway inside wall 24 that defines a conduit or an opening into the reaction zone 12. The manway insert 26 is, thus, capable of extending through the manway conduit and into the reaction zone 14 wherein the insert lower end 46 terminates.

The insert upper end 45 may further include a flange 56 extending horizontally and outwardly from the insert outside wall 43 and providing for its seating upon a face 58 of the inlet manway flange 60. The face 58 of the inlet manway flange 60 provides a bearing upon which the flange 56 may rest. The flange 56, thus, provides means for transferring the load from the support structure 30, and the objects supported thereon, through the support system 12 and onto the inlet manway 20.

In a preferred embodiment, the face 58 is provided with means for forming a ring joint with an opposing manway cover flange (not shown). An example of such means includes a groove or a bevel that is machined or formed into the face 58. This groove or bevel is capable of being matched with a matching and opposing groove or bevel that is machined or formed into the face of the opposing manway cover flange. A ring joint gasket may be placed within the groove or bevel of the face 58 and the opposing groove or bevel of the face of the opposing manway cover flange so that when the two flanges are joined together the ring joint is formed. If the spacing being the face 58 and the face of the opposing manway cover flange is not sufficient to permit the placement of the flange 56 upon the face 58 and the formation of the aforedescribed ring joint, a wider ring joint gasket may be used, or, alternatively, a chamber may be formed in the face of the opposing manway cover flange so as to allow for the placement of the flange 56 upon the face 58 and the joining of the flange 60 with the opposing manway cover flange in a manner so as to provide a desirable ring joint.

In a preferred embodiment, the manway inside wall 24 has a cylindrical geometry that can be characterized by a diameter, and it is further preferred for the insert outside wall 43 to extend to within close proximity to and along the manway inside wall 24 and, more preferably, with the insert outside wall 43 being substantially flush against the manway inside wall 24. It is also preferred for the insert inside wall 44 to define a conduit through which a fluid may be introduced into the reaction zone 14 or through which a feed inlet pipe may extend to provide means for introducing a fluid from outside to within the reaction zone 14.

Figure 3:
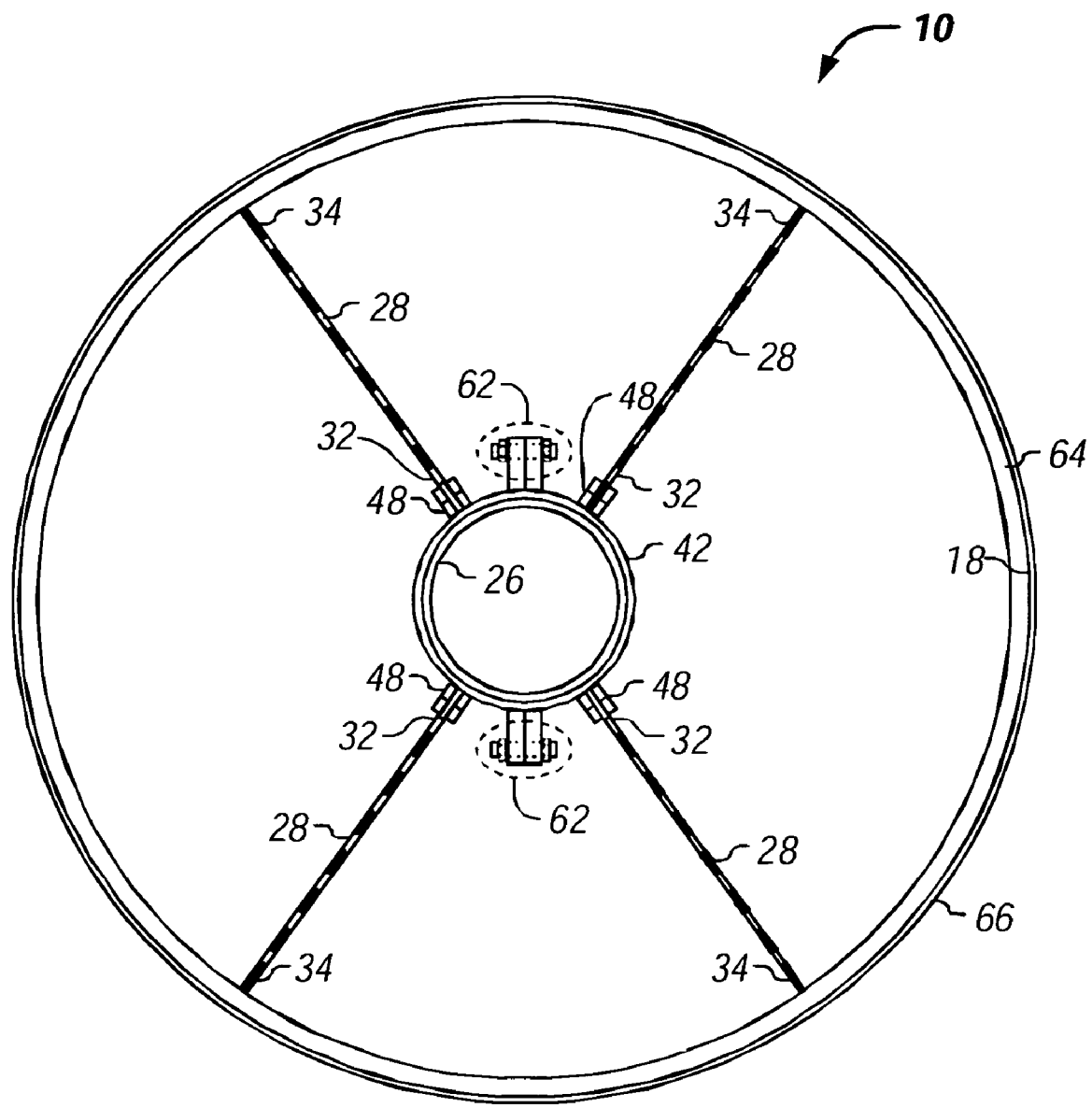
FIG. 3 is a cross-sectional view of the reactor vessel and support system taken along line 3-3 of FIG. 1.

Now referring to FIG. 3, which is a cross-sectional view of the reactor vessel 10 taken along line 3-3 of FIG. 1. Shown is the clamp 42 onto which are affixed plates 48. The plates 48 provide means for fixedly connecting the hanger upper ends 32 of the support hangers 28 to the manway insert 26. As already noted above, in a preferred embodiment, the plates 48 and the hanger upper end 32 will have holes that are matching through which a bolt may be passed to form a connection. This type of connection permits the fabrication of the individual parts of the support system 12 off-site from the location of the reactor vessel 10 and the later and separate assembly of the individual parts of the support system 12 within the reaction zone 14 of the reactor vessel 10.

The clamp 42 is affixed to the manway insert 26 using a hole-and-bolt connection 62, which permits the separate fabrication and subsequent assembly of the clamp 42, along with the other parts of the support system 12, within the reaction zone 14. It should be recognized, however, that while the connections shown are the so-called hole-and-bolt connection, any other suitable connecting means can be used in the support system 12.

The support hangers 28 extend from manway insert 26 downwardly to a skirt 64 of the support structure 30 (not shown in FIG. 3). The skirt 64 may be a structural element that extends to within close proximity to and along the inside wall 18 of the reactor vessel 10. The skirt 64 provides means for attaching additional elements that make up the support structure 30 and means for supporting various types of reactor internal equipment, such as, for example, a fluid distributor tray (not shown) for distributing a reactor feed fluid across the surface and cross section of the bed 16 of catalyst particles.

The skirt 64 may be a flat plate of a structural element having a flat face 66 that may be placed flush against the inside wall 18, and, further, it may include one or more flanges. Further provided is sealing means (not shown) for sealing the space between the inside wall 18 of the reactor vessel 10 and the flat face 66 of skirt 64 to thereby prevent the excessive flow of fluid through the space that is formed between the inside wall 18 and flat face 66. Any suitable material or means may be used to form this seal. The skirt 64 may also be any other suitable structural element that can provide support means for supporting a load such as the aforementioned distribution tray system. The hanger lower end 34 of support hanger 28 extends downwardly and away from the manway insert 26, and it is fixedly connected to the skirt 64.

Figure 4:
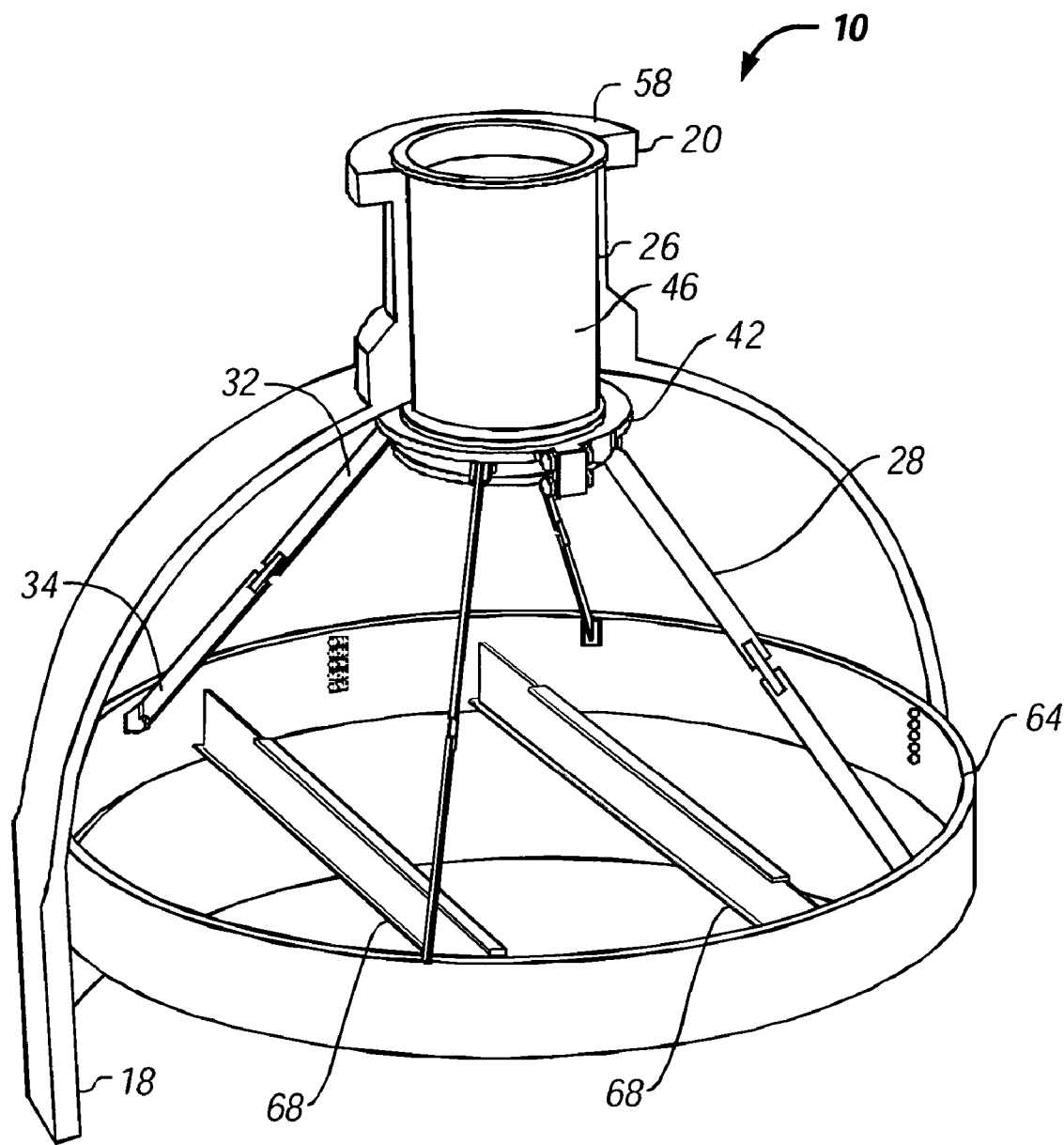
FIG. 4 is a perspective view with the reactor vessel cut away to show the support system contained in the reactor vessel.

To provide further illustration of the inventive support system 12, FIG. 4 presents a perspective view of the reactor vessel 10 that is cut away to show the support system 12 associated with the reactor vessel 10. As is shown, the reactor vessel 10 is equipped with the inlet manway 20 providing for an opening into the inside of the reactor vessel 10. The manway insert 26 is supported by the inlet manway 20 at the flange face 58, and the manway insert 20 extends through the opening that is defined by the inlet manway 20 into the inside of the reactor vessel 10 where the insert lower end 46 of the manway insert 26 terminates. Fastened to the insert lower end 46 is clamp 42, which provides means for connecting support hanger 28 to the manway insert 20 and means for transferring the load from the support hanger 28 to the manway insert 20.

Each support hanger 28 has a hanger upper end 32 and a hanger lower end 34. The hanger upper end 32 is fixedly attached to the clamp 42 and the hanger lower end 34 is fixedly attached to a skirt 64, which is part of the support structure 30 (See FIG. 1). Support structure 30 provides means for supporting a load resulting from reactor internal device such as, preferably, a fluid distributor tray. The skirt 64 extends along the circumference of the inside wall 18 of the reactor vessel 10. The support structure 30 may further include additional support members such as one or more beams 68, which extend horizontally and are affixed at each of their ends to the inside circumference of the skirt 64.

It is understood that while particular embodiments of the invention have been described herein, reasonable variations, modifications and adaptations thereof may be made that are within the scope of the disclosure and the appended claims without departing from the scope of the invention as defined by the claims.

That which is claimed is:

1. A support system for use with a reactor vessel having an inside wall that defines a reaction zone capable of containing a bed of catalyst particles and which includes an inlet manway providing an opening into said reaction zone, wherein said support system comprises:
   a manway insert having an insert upper end and an insert lower end, wherein said manway insert is capable of extending through said opening into said reaction zone;
   a support hanger having a hanger upper end and a hanger lower end with said hanger upper end being fixedly connected to said insert lower end; and
   a support structure capable of supporting a fluid distributor tray and which is fixedly connected to said hanger lower end.

2. A support system as recited in claim 1, wherein said insert upper end further includes support means for transferring a load from said support system to a bearing.

3. A support system as recited in claim 2, wherein affixed to said insert lower end is attachment means for connecting said hanger upper end to said insert lower end.

4. A support system as recited in claim 3, wherein said support structure further includes a skirt extending to and along said inside wall.

5. A support system as recited in claim 4, wherein said support means includes a flange extending outwardly from said manway insert and providing for seating upon said bearing.

6. A support system as recited in claim 5, wherein said attachment means includes detachable clamp means for connecting said hanger upper end and for transferring of load to said manway insert.

7. A support system for use with a reactor vessel having an inside reactor wall that defines a reaction zone capable of containing a bed of catalyst particles and which includes an inlet manway having an inside manway wall defining a manway conduit into said reaction zone, wherein said support system comprises:
   an insert having an insert outside wall, an insert inside wall defining a insert conduit, an insert upper end, and an insert lower end, wherein said insert is capable of extending through said manway conduit into said reaction zone and with said insert lower end terminating within said reaction zone;
   a support hanger having a hanger upper end and a hanger lower end with said hanger upper end being fixedly connected to said insert lower end; and
   support structure means for supporting a load, wherein said support structure means is fixedly connected to said hanger lower end.

8. A support system as recited in claim 7, wherein said support structure further includes a skirt extending to and along said inside reactor wall.

9. A support system as recited in claim 8, wherein said insert outside wall extends to and along said inside manway wall.

10. A support system as recited in claim 9, wherein said manway conduit has a geometry that is cylindrical.

11. A distributor tray support system for use with a reactor vessel that defines a reactor zone and has an inlet manway providing an opening into said reactor zone, wherein said distributor tray support system comprises:
   a manway insert supported by said inlet manway and extending through said opening of said inlet manway and into said reactor zone;
   wherein attached to said manway insert is attachment means for connecting a support hanger to said manway insert and for transferring the load from said support hanger to said manway insert;
   wherein said support hanger has an upper end and a lower end; and
   wherein said upper end is fixedly attached to said attachment means and said lower end is fixedly attached to distributor tray support structure means for supporting a distributor tray.

* * * * *